United States Patent
Akahori

(10) Patent No.: US 8,642,968 B2
(45) Date of Patent: Feb. 4, 2014

(54) TOMOGRAPHIC IMAGE GENERATING APPARATUS AND TOMOGRAPHIC IMAGE GENERATING METHOD

(75) Inventor: Sadato Akahori, Kanagawa-ken (JP)

(73) Assignee: Fujifilm Corporation, Tokyo (JP)

(*) Notice: Subject to any disclaimer, the term of this patent is extended or adjusted under 35 U.S.C. 154(b) by 0 days.

(21) Appl. No.: 13/605,224

(22) Filed: Sep. 6, 2012

(65) Prior Publication Data

US 2013/0056644 A1 Mar. 7, 2013

(30) Foreign Application Priority Data

Sep. 7, 2011 (JP) .................. 2011-194464

(51) Int. Cl.
*G01T 1/166* (2006.01)
(52) U.S. Cl.
USPC .................................................. 250/363.02
(58) Field of Classification Search
USPC .......... 250/362, 363.02, 363.03, 363.04, 366, 250/394
See application file for complete search history.

(56) References Cited

U.S. PATENT DOCUMENTS

| | | | |
|---|---|---|---|
| 6,810,102 B2 | 10/2004 | Hsieh et al. | |
| 6,845,141 B2 | 1/2005 | Flohr et al. | |
| 6,980,624 B2 | 12/2005 | Li et al. | |
| 2003/0072478 A1 | 4/2003 | Claus et al. | |
| 2004/0066911 A1 | 4/2004 | Hsieh et al. | |
| 2005/0111616 A1 | 5/2005 | Li et al. | |
| 2009/0034817 A1 | 2/2009 | Boese et al. | |

FOREIGN PATENT DOCUMENTS

| | | |
|---|---|---|
| JP | 2003-199737 | 7/2003 |
| JP | 2003-534856 | 11/2003 |
| JP | 2004-121853 | 4/2004 |
| JP | 2005-152658 | 6/2005 |
| JP | 2006-320591 | 11/2006 |
| JP | 2008-154647 | 7/2008 |
| JP | 2008-200273 | 9/2008 |
| JP | 2009-279301 | 12/2009 |
| JP | 2010-046102 | 3/2010 |

OTHER PUBLICATIONS

European Search Report—12 18 3363—Jan. 16, 2013.
Jared Starman et al.—Estimating 0th and 1st Moments in C-Arm CT Data for Extrapolating Truncated Projections, Proceedings of SPIE, vol. 5747, Apr. 29, 2005, pp. 378-387, XP055048974, ISSN: 0277-786X, DOI: 10.1117/12.596041.
Japanese Official Action—2011-194464—Aug. 20, 2013.
Devon J. Godfrey et al, Practical strategies for the clinical implementation of matrix inversion tomosynthesis (MITS), Proc. SPIE. 5030, Medical imaging 2003: Physics of Medical Imaging, 2003, pp. 379-390.

*Primary Examiner* — Mark R Gaworecki
(74) *Attorney, Agent, or Firm* — Young & Thompson

(57) ABSTRACT

A tomographic image of a subject is generated from projection image data acquired in a series of image capturing processes carried out by a radiation detector based on radiation emitted from a radiation source and transmitted through the subject. An extrapolating process is performed on each of the projection image data along a prescribed direction, and a smoothing process is performed on each of the projection image data along a direction perpendicular to the prescribed direction, thereby determining values of a plurality of pixels in non-detecting regions, which do not belong to a detecting region of the radiation detector. The determined values of the pixels also are used to generate the tomographic image.

13 Claims, 12 Drawing Sheets

FIG. 11A
Prior Art
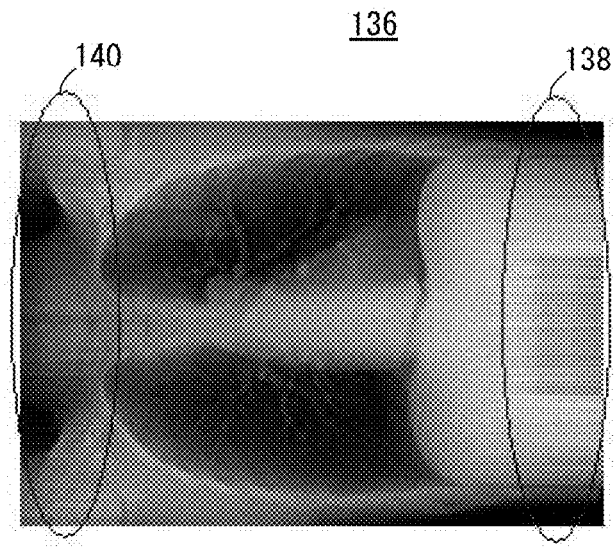
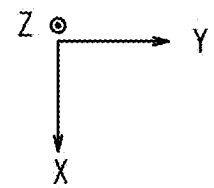
FIG. 11B
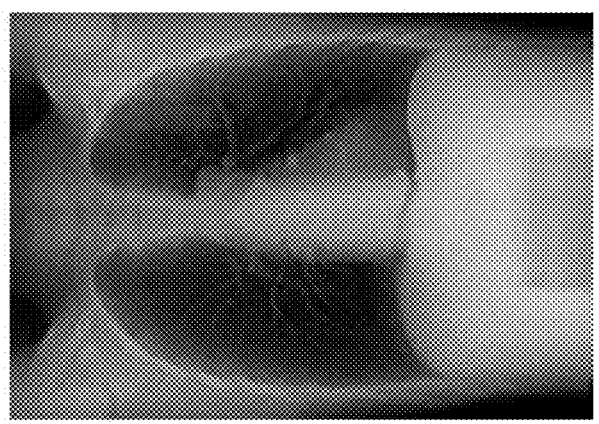
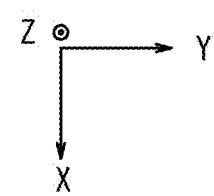

TOMOGRAPHIC IMAGE GENERATING APPARATUS AND TOMOGRAPHIC IMAGE GENERATING METHOD

CROSS-REFERENCE TO RELATED APPLICATION

This application is based upon and claims the benefit of priority from Japanese Patent Application No. 2011-194464 filed on Sep. 7, 2011, of which the contents are incorporated herein by reference.

BACKGROUND OF THE INVENTION

1. Field of the Invention

The present invention relates to an apparatus for and a method of generating a tomographic image.

2. Description of the Related Art

Recently, apparatus have been proposed in the medical field for irradiating an affected area in a subject such as a human body with radiation from a radiation source, which is moved to different positions to capture respective radiographic images of the affected area, and for processing the obtained projection image data into a desired tomographic image of the affected area for detailed observation of the affected area.

Japanese Laid-Open Patent Publication No. 2004-121853 discloses a method of and an apparatus for reconstructing an image in an external area of a field of view by enhancing partially sampled field-of-view data using fully sampled field-of-view data. Since the disclosed method and apparatus is capable of expanding the range that can be represented as a tomographic image, the disclosed method and apparatus is highly convenient for use in diagnostic applications.

There have also been proposed various processes for minimizing artifacts (false images) in tomographic images by improving a process of calculating partially sampled field-of-view data.

Japanese Laid-Open Patent Publication No. 2005-152658 discloses an apparatus for and a method of assigning irregular coefficients to respective sliced positions (equivalent to respective pixels) of backprojection data, and performing a product-sum operation on acquired projection image data in order to generate a tomographic image.

Japanese Laid-Open Patent Publication No. 2008-200273 reveals an apparatus for and a method of replacing the values of pixels, which are judged as forming an incompletely focused area (partially sampled field-of-view data), with a prescribed constant value in order to fill in such pixels.

SUMMARY OF THE INVENTION

However, the apparatus and methods disclosed in Japanese Laid-Open Patent Publication No. 2004-121853, Japanese Laid-Open Patent Publication No. 2005-152658, and Japanese Laid-Open Patent Publication No. 2008-200273 are disadvantageous in that the amount of processed data required to generate a tomographic image increases, and to the extent that a long waiting time is required from the end of the image capturing process until the start of the diagnostic process based on the generated tomographic image.

It is an object of the present invention to provide an apparatus for and a method of generating a tomographic image, which is representative of an expanded range, while reducing the amount of processed data required to generate the tomographic image, and minimizing artifacts produced in the tomographic image.

According to the present invention, there is provided a tomographic image generating apparatus comprising a radiation source for applying radiation to a subject, a radiation detector for detecting radiation that has passed through the subject and acquiring projection image data from the detected radiation, and a tomographic image generating unit for generating a tomographic image in a region of interest disposed in the subject and interposed between the radiation source and the radiation detector, using a plurality of projection image data acquired by the radiation detector in image capturing processes, which are carried out while a relative positional relationship between the radiation source and the radiation detector successively changes. The tomographic image generating unit includes a data determiner for performing an extrapolating process on each of the acquired projection image data along a prescribed direction, and for performing a smoothing process on each of the acquired projection image data along a direction perpendicular to the prescribed direction, thereby determining values of a plurality of pixels in non-detecting regions, which do not belong to a detecting region of the radiation detector, the determined values of the pixels also being used to generate the tomographic image.

Since the extrapolating process is carried out on each of the acquired projection image data along the prescribed direction, the tomographic image can be generated without the need for special processing sequences. Since the smoothing process is performed along the direction perpendicular to the prescribed direction in order to determine the values of the pixels in the non-detecting regions, it is possible to reduce striped density irregularities that extend along the prescribed direction, which might otherwise be caused by the extrapolating process. Consequently, in a case where a tomographic image including expanded regions is generated, the amount of processed data required to generate the tomographic image can be reduced, and artifacts can be prevented from occurring in the tomographic image.

The prescribed direction preferably comprises a direction projected onto a projection plane including the detecting region, and extending parallel to a direction of relative motion of the radiation source.

The tomographic image generating unit preferably further includes a projection region determiner for determining a projection region on the projection plane, onto which the radiation source projects the region of interest, based on information concerning the position of the region of interest and the relative positional relationship. The data determiner preferably determines values of a plurality of pixels in non-detecting regions, which belong to the projection region determined by the projection region determiner, and which do not belong to the detecting region.

The projection region determiner preferably determines a projection region of one size irrespective of the relative positional relationship.

The tomographic image generating unit preferably further includes a data corrector for correcting a spectral intensity at each spatial frequency of the projection image data that exhibits geometric unsharpness due to the image capturing processes.

The data corrector preferably corrects the projection image data before the data determiner determines the values of the pixels in the non-detecting regions.

The data determiner preferably determines the values of the pixels in the non-detecting regions such that differences between the values of pixels adjacent to boundaries between the detecting region and the non-detecting regions fall within a prescribed range.

The data determiner preferably performs a zeroth-order extrapolating process or a first-order extrapolating process to thereby determine the values of the pixels in the non-detecting regions.

The tomographic image generating unit preferably performs a blackening process on the tomographic image for bringing to a prescribed constant value the values of plural pixels that belong to a prescribed region existing within the region of interest.

The data determiner preferably determines the values of the pixels in the non-detecting regions by performing the extrapolating process on a plurality of pixels in the detecting region, based on values produced by the smoothing process performed along the direction perpendicular to the prescribed direction.

The data determiner preferably determines the values of the pixels in the non-detecting regions by performing the smoothing process along the direction perpendicular to the prescribed direction on a plurality of pixels in the non-detecting regions, the values of which are temporarily determined by the extrapolating process, after the extrapolating process has been performed.

The tomographic image generating apparatus preferably further comprises a display unit for displaying marks indicative of a distribution of added numbers of pixels belonging to the detecting region and which are used to generate the tomographic image, the marks being displayed in overlapping relation to the tomographic image generated by the tomographic image generating unit.

According to the present invention, there also is provided a method of generating a tomographic image of a subject using a radiation source for applying radiation to the subject, and a radiation detector for detecting radiation that has passed through the subject and acquiring projection image data from the detected radiation, and by carrying out image capturing processes while a relative positional relationship between the radiation source and the radiation detector successively changes, comprising the steps of acquiring a plurality of projection image data through the radiation detector, and performing an extrapolating process on each of the acquired projection image data along a prescribed direction, and performing a smoothing process on each of the acquired projection image data along a direction perpendicular to the prescribed direction, thereby determining values of a plurality of pixels in non-detecting regions, which do not belong to a detecting region of the radiation detector, the determined values of the pixels also being used to generate the tomographic image.

With the tomographic image generating apparatus and the tomographic image generating method according to the present invention, an extrapolating process is performed on the acquired projection image data along the prescribed direction in order to generate a tomographic image without the need for any special processing sequences. Further, since a smoothing process along the direction perpendicular to the prescribed direction also is performed in order to determine values of the pixels in the non-detecting regions, it is possible to reduce striped density irregularities that extend along the prescribed direction, which might otherwise be caused by the extrapolating process. Consequently, in a case where a tomographic image including expanded regions is generated, the amount of processed data required to generate the tomographic image is reduced, and artifacts are prevented from occurring in the tomographic image.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 11A is a view of a visualized tomographic image obtained if the smoothing process is not performed;

FIG. 11B is a view of a visualized tomographic image obtained if the smoothing process is performed.

DESCRIPTION OF THE PREFERRED EMBODIMENTS

A tomographic image generating method according to a preferred embodiment of the present invention in relation to a tomographic image generating apparatus that carries out the tomographic image generating method will be described in detail below with reference to the accompanying drawings.

Figure 1:
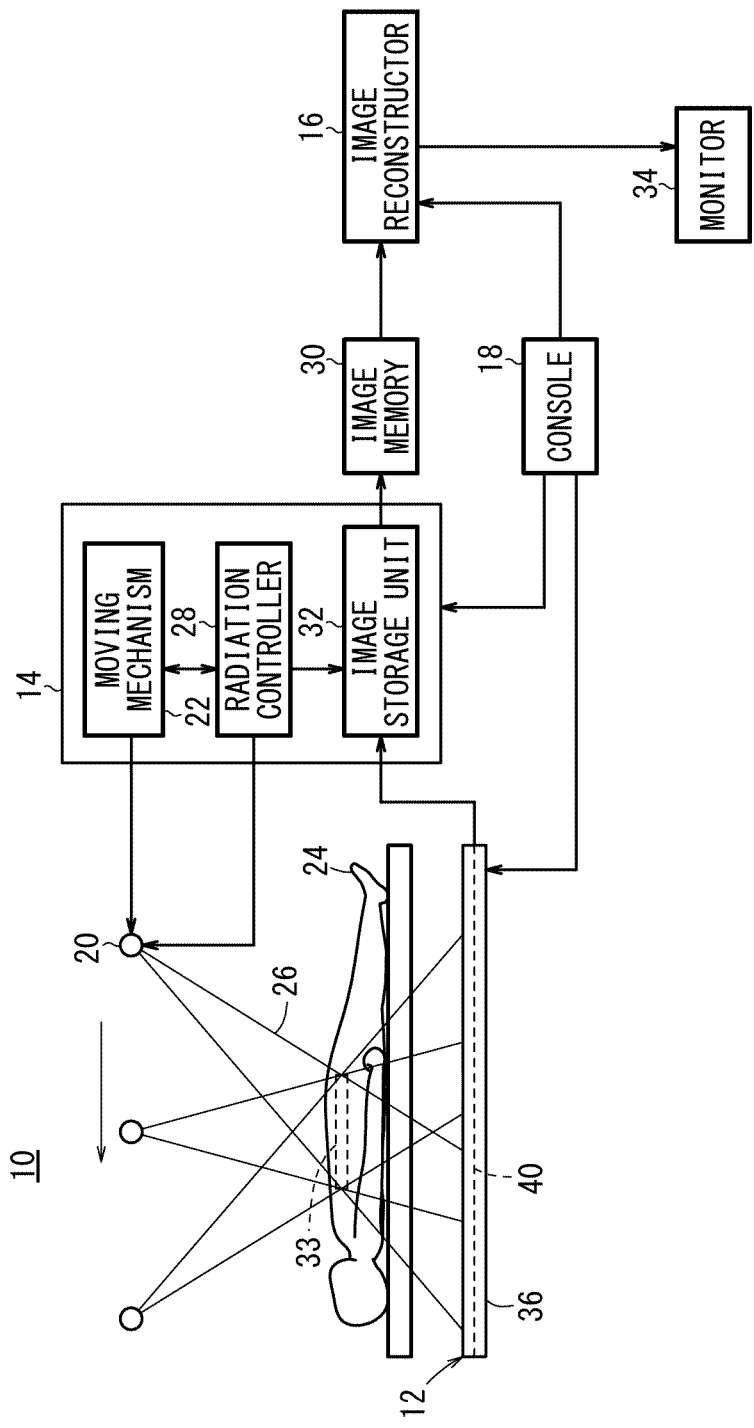
FIG. 1 is a schematic view, partially in block form, of a tomographic image generating apparatus according to an embodiment of the present invention.

As shown in FIG. 1, a tomographic image generating apparatus 10 according to an embodiment of the present invention basically includes a radiation detecting device 12, a projection image data acquiring assembly 14, an image reconstructor 16, and a console 18 for controlling the radiation detecting device 12, the projection image data acquiring assembly 14, and the image reconstructor 16.

The projection image data acquiring assembly 14 includes a radiation source 20 disposed in confronting relation to the radiation detecting device 12, a moving mechanism 22 for moving the radiation source 20 successively to a plurality of preset positions, a radiation controller 28 for controlling the radiation source 20 to apply radiation 26 to a subject 24 over the radiation detecting device 12 at times coincident with the radiation source 20 reaching each of the preset positions, and an image storage unit 32 for storing in an image memory 30 a plurality of projection image data sent successively from the radiation detecting device 12.

The image reconstructor 16 processes the plural projection image data stored in the image memory 30 in order to generate or reconstruct a tomographic image including a certain region 33 (hereinafter referred to as a "designated region 33") of the subject 24. The image reconstructor 16 supplies image data representing the tomographic image to a monitor 34 (display unit) for displaying the tomographic image.

Figure 2:
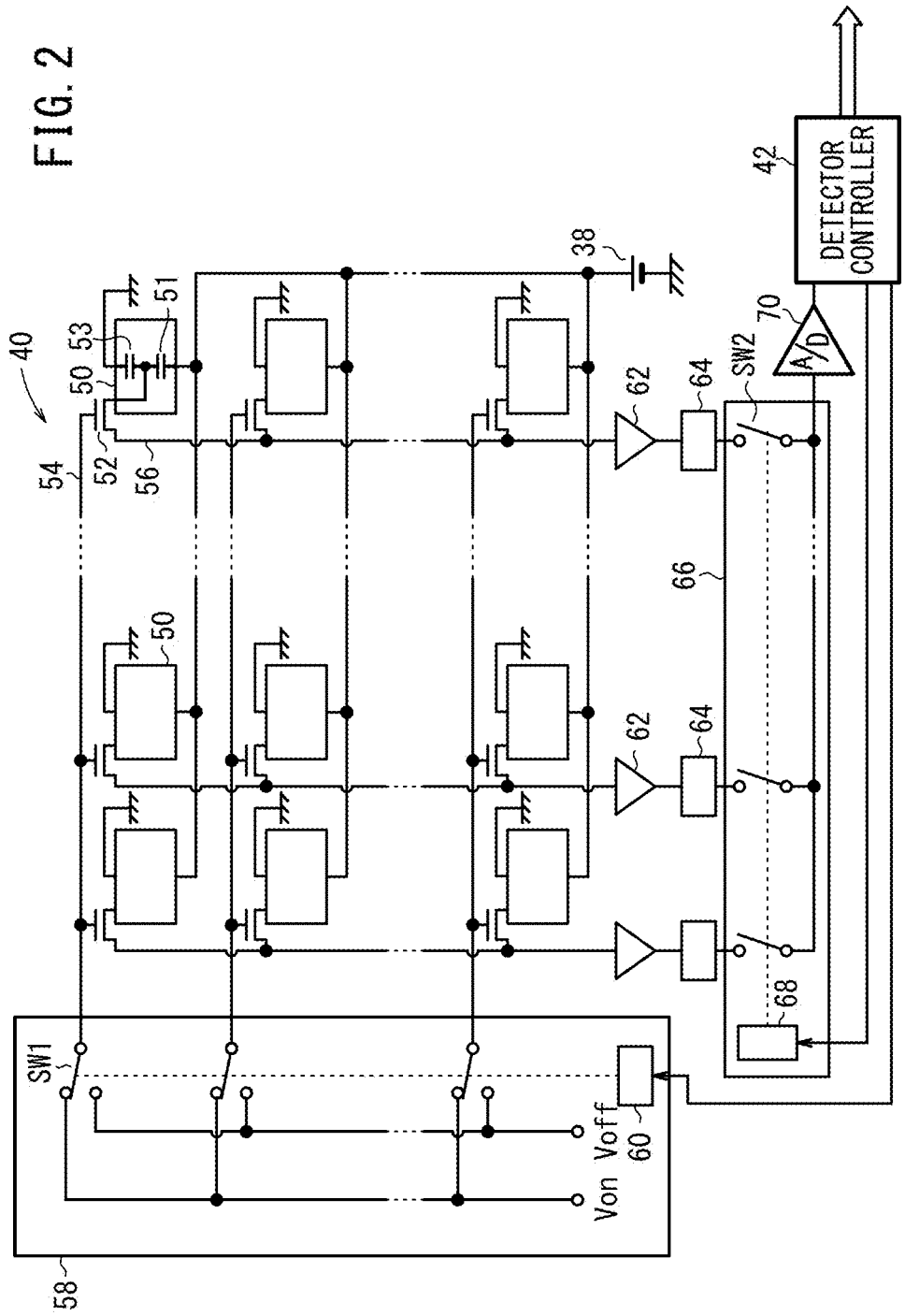
FIG. 2 is a circuit diagram, partially in block form, of a radiation detector in the tomographic image generating apparatus shown in FIG. 1.

As shown in FIGS. 1 and 2, the radiation detecting device 12 includes a casing 36, a battery 38 (see FIG. 2) housed in the casing 36, a radiation detector 40 housed in the casing 36, and a detector controller 42 housed in the casing 36.

As shown in FIG. 2, the radiation detector 40 comprises an array of thin-film transistors (TFTs) 52 arranged in rows and columns, a photoelectric conversion layer 51 made of a material such as amorphous selenium (a-Se) for generating electric charges upon detection of radiation 26, the photoelectric conversion layer 51 being disposed on the array of TFTs 52, and an array of storage capacitors 53 connected to the photoelectric conversion layer 51. Upon application of radiation 26 to the radiation detector 40, the photoelectric conversion layer 51 generates electric charges, and the storage capacitors 53 store the generated electric charges. Then, the TFTs 52 are turned on along each row at a time to read the electric charges from the storage capacitors 53 as an image signal. In FIG. 2, the photoelectric conversion layer 51 and one of the storage capacitors 53 are shown as a pixel 50, the pixel 50 being connected to one of the TFTs 52. Details of the other pixels 50 are omitted from illustration. Since amorphous selenium tends to change in structure and lose functions thereof at high temperatures, amorphous selenium needs to be used within a certain temperature range. Therefore, some means for cooling the radiation detector 40 should preferably be provided in the casing 36.

The TFTs 52, which are connected to the respective pixels 50, are connected to respective gate lines 54 extending parallel to the rows, and to respective signal lines 56 extending parallel to the columns. The gate lines 54 are connected to a line scanning driver 58, and the signal lines 56 are connected to a multiplexer 66 that serves as a reading circuit.

The gate lines 54 are supplied with control signals Von, Voff for turning on and off the TFTs 52 along the rows from the line scanning driver 58. The line scanning driver 58 comprises a plurality of first switches SW1 for switching between the gate lines 54, and an address decoder 60 for outputting a selection signal for selecting one of the first switches SW1 at a time. The address decoder 60 is supplied with an address signal from the detector controller 42.

The signal lines 56 are supplied with electric charges stored in the storage capacitors 53 of the pixels 50 through the TFTs 52 arranged in the columns. The electric charges supplied to the signal lines 56 are amplified by amplifiers 62, which are connected respectively to the signal lines 56. The amplifiers 62 are connected through respective sample and hold circuits 64 to the multiplexer 66. The multiplexer 66 comprises a plurality of second switches SW2 for successively switching between the signal lines 56, and an address decoder 68 for outputting a selection signal for selecting one of the second switches SW2 at a time. The address decoder 68 is supplied with an address signal from the detector controller 42. The multiplexer 66 has an output terminal connected to an A/D converter 70. An image signal generated by the multiplexer 66 based on electric charges from the sample and hold circuits 64 is converted by the A/D converter 70 into a digital image signal (projection image data), which is supplied to the detector controller 42. The detector controller 42 supplies the projection image data to the image memory 30 (see FIG. 1), which stores the supplied projection image data. In summary, each time that the tomographic image generating apparatus 10 operates to perform a radiographic image capturing process, the radiation detecting device 12 outputs projection image data. Projection image data successively output from the radiation detecting device 12 are stored in the image memory 30 in chronological order, for example.

The projection image data acquiring assembly 14 moves the radiation source 20 disposed in facing relation to the radiation detecting device 12 successively to a plurality of different positions. Each time that the radiation source 20 reaches one of the positions, the radiation source 20 applies radiation 26 to the subject 24 over the radiation detecting device 12, which detects radiation 26 that has passed through the subject 24, and generates projection image data of the subject 24 data based on the detected radiation 26. Therefore, as the radiation source 20 moves successively through the respective positions, the radiation source 20 applies radiation 26 to the subject 24 at different angles or in different directions, and the radiation detecting device 12 generates a plurality of projection image data of the subject 24.

The tomographic image generating apparatus 10 according to the illustrated embodiment includes the radiation source 20, which is movable with respect to the radiation detector 40 that is fixed in place. However, at least one of the radiation source 20 and the radiation detector 40 may be moved in order to capture a plurality of projection image data of the subject 24 at different angles. In FIG. 1, the radiation source 20 is shown as being moved and placed in three different positions, which are spaced along the longitudinal axis of the subject 24. However, the radiation source 20 may be moved and placed in two different positions, or in four or more different positions. In FIG. 1, the radiation source 20 is moved along a straight path interconnecting the different positions. However, the radiation source 20 may be moved along a curved path such as an arcuate path that interconnects the different positions.

For facilitating understanding of the present invention, certain terms used in the description of the present invention will be explained with reference to FIGS. 3A through 5B. It is assumed herein that the radiation detector 40 is fixed in position at all times. Image capturing processes referred to in the present invention include an individual image capturing process, which is carried out at a time when the radiation source 20 has reached each of the preset positions, and a collective image capturing process, which collectively represents a plurality of individual image capturing processes. Each individual image capturing process will be referred to as a "radiographic image capturing process", and the collective image capturing process, which collectively represents a plurality of individual image capturing processes, will be referred to as a "tomosynthetic image capturing process".

Figure 3A:
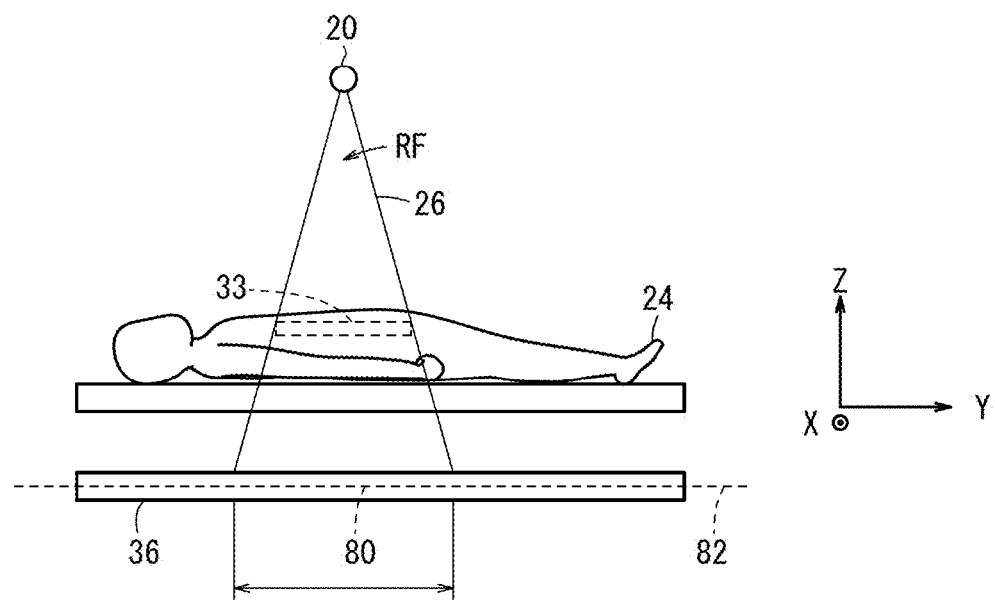
FIG. 3A is a side elevational view illustrative of a radiographic image capturing process, in which a radiation source is displaced to a frontal position.

FIG. 3A illustrates a radiographic image capturing process (a so-called scout image capturing process) with the radiation source 20 displaced to a frontal position. In FIG. 3A, the designated region 33 in the subject 24 corresponds to a sectional region of a radiation field RF at a certain height (Z-axis position). In FIG. 3A and other relevant figures, the Z-axis extends vertically perpendicular to the longitudinal axis of the subject 24 who lies horizontally over the radiation detecting device 12, the Y-axis extends along the longitudinal axis of the subject 24, and the X-axis extends horizontally transverse to the longitudinal axis of the subject 24 and perpendicular to the Z-axis and the Y-axis. The designated region 33 comprises a planar region which lies substantially parallel to a flat region (hereinafter referred to as a "detecting region 80") where the pixels 50 (see FIG. 2) of the radiation detector 40 reside. With the designated region 33 being established at a certain position in the subject 24, a desired tomographic image of the designated region 33 is generated. The designated region 33 lies within a sectional plane 84 (see FIG. 4A) in the subject 24. The designated region 33 becomes progressively smaller as the sectional plane 84 is shifted in a positive direction (upward direction) along the Z-axis. For illustrative purposes, the designated region 33 as well as later-described expanded regions 90, 92 (see FIG. 5A) are illustrated as having a thickness along the Z-axis.

Figure 3B:
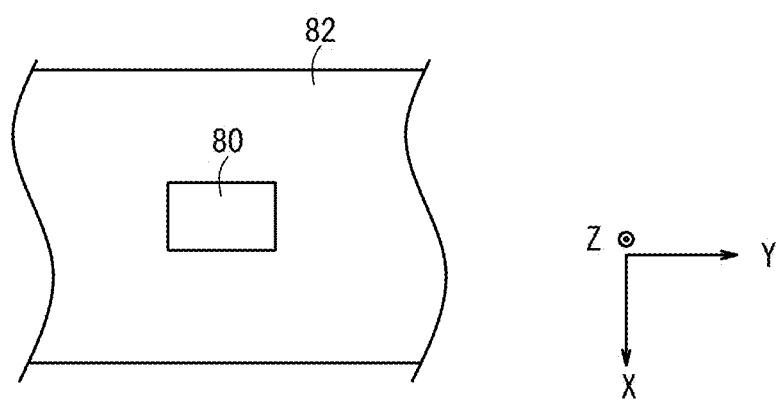
FIG. 3B is a fragmentary view illustrating the concepts of a detecting region of the radiation detector and a projection plane.

As shown in FIG. 3B, a projection plane 82 is defined in common to projection image data that is used to generate a tomographic image. The projection plane 82 may be defined as a plane including the detecting region 80 of the radiation detector 40. In other words, the projection plane 82 is a plane onto which the projection image data are projected, or onto which the projection image data preferably are projected for processing purposes. In the present embodiment, the detecting region 80 is flat and the projection plane 82 also is flat. However, the detecting region 80 may be curved, and the projection plane 82 may be defined as including a curved detecting region 80.

If the radiation source 20 is moved to other positions apart from the frontal position shown in FIG. 3A and image capturing processes are carried out with the radiation source 20 in such other positions, the radiation field RF may not cover the designated region 33 in its entirety during the image capturing processes. Stated otherwise, the designated region 33 may include a partial region, which cannot be backprojected with the projection image data obtained by the image capturing processes. However, if image regions, i.e., projection regions, are expanded by making up for a shortage of the projection image data, then even though the partial region cannot be backprojected, backprojection image data can be calculated therefor. By using in combination the projection image data that actually are detected by the radiation detector 40 and virtual projection image data that are not actually detected by the radiation detector 40, it is possible to expand a region of interest 94 (see FIG. 5A) for which a tomographic image is to be generated for the benefit of the user (a doctor or radiological technician) in diagnostic practice. A process of determining the region of interest 94 in relation to a maximum size thereof will be described with reference to FIGS. 4A through 5B.

Figure 4A:
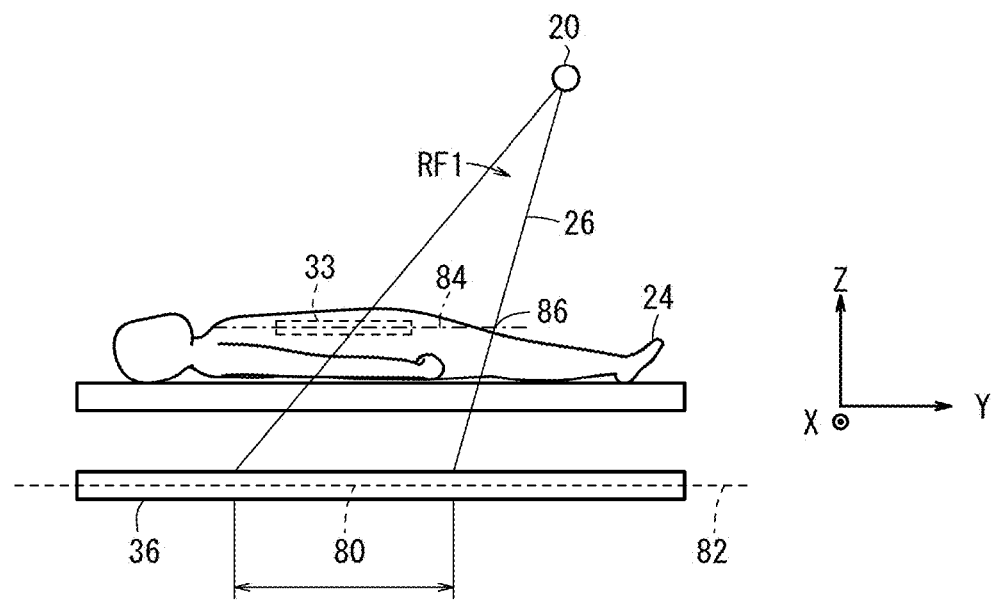
FIG. 4A is a side elevational view illustrative of a tomosynthetic image capturing process upon initiation of the process.

As shown in FIG. 4A, at the start of a tomosynthetic image capturing process, the radiation source 20, which is located in one of the positions other than the frontal position, makes a projection, i.e., applies radiation 26 to the detecting region 80, thereby creating a radiation field RF1. At this time, the radiation source 20 is displaced in a positive direction along the Y-axis, and hence the radiation field RF1 also is displaced in the positive direction along the Y-axis, compared with the radiation field RF (see FIG. 3) at the time that the radiation source 20 is in the frontal position. A line of intersection between the sectional plane 84, which includes the designated region 33 and the radiation field RF1, will be referred to as a "boundary line 86".

Figure 4B:
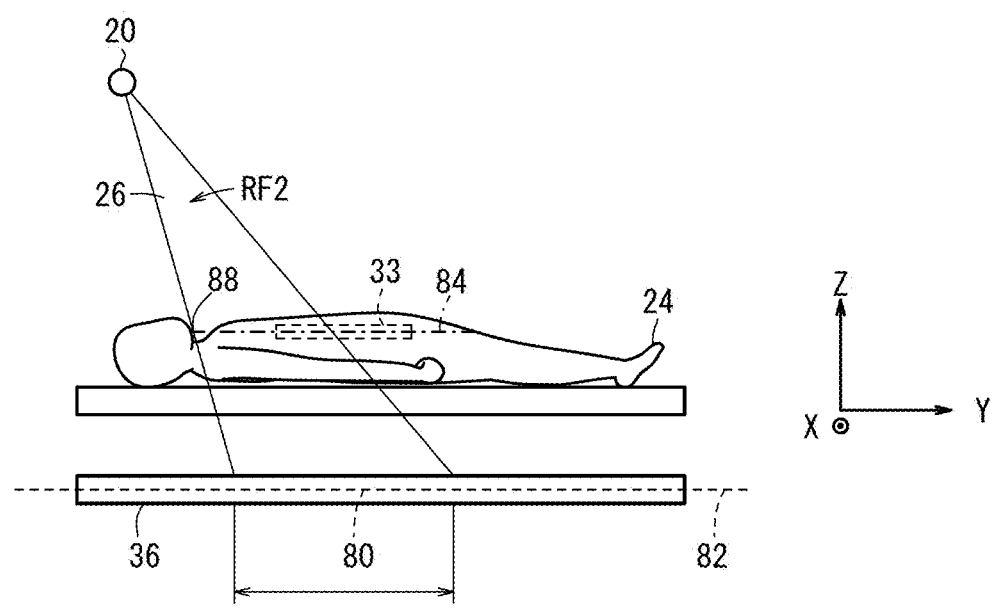
FIG. 4B is a side elevational view illustrative of the tomosynthetic image capturing process upon termination of the process.

As shown in FIG. 4B, at the end of the tomosynthetic image capturing process, the radiation source 20, which is located in another one of the positions other than the frontal position, makes a projection, i.e., applies radiation 26 to the detecting region 80, thereby creating a radiation field RF2. At this time, the radiation source 20 is displaced in a negative direction along the Y-axis, and hence the radiation field RF2 also is displaced in the negative direction along the Y-axis, compared with the radiation field RF (see FIG. 3) at the time that the radiation source 20 is in the frontal position. A line of intersection between the sectional plane 84, which includes the designated region 33 and the radiation field RF2, will be referred to as a "boundary line 88". The boundary line 86 shown in FIG. 4A and the boundary line 88 shown in FIG. 4B represent line segments extending along the X-axis.

For generating a tomographic image using at least one of the projection image data that actually are detected by the radiation detector 40, a region of interest 94, opposite sides of which are defined by the boundary lines 86 and 88, may be established. As shown by hatching in FIG. 5A, the region of interest 94 corresponds to the sum of the designated region 33 and the expanded regions 90, 92.

Figure 5A:
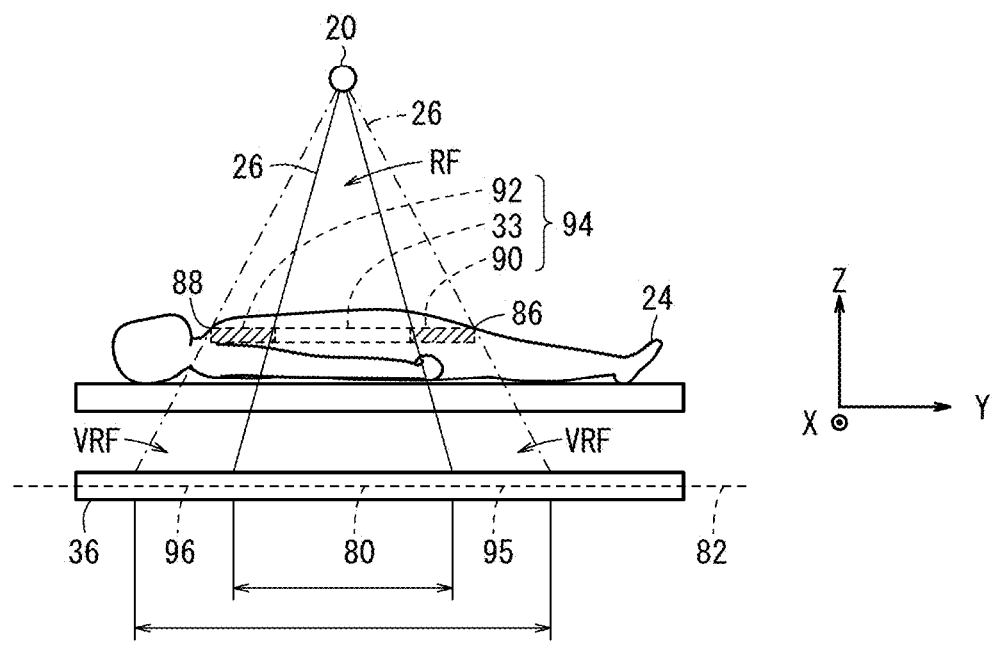
FIGS. 5A and 5B are views illustrating the concepts of a region of interest, a projection region, a detecting region, and non-detecting regions.
Figure 5B:
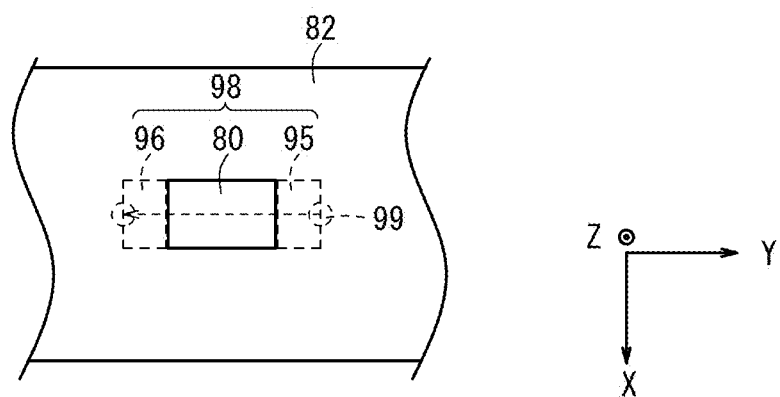

As shown in FIGS. 5A and 5B, the expanded region 90 is a planar region, opposite sides of which are defined by a side of the designated region 33 facing in the positive direction of the Y-axis and the boundary line 86, and the expanded region 92 is a planar region, opposite sides of which are defined by a side of the designated region 33 facing in the negative direction of the Y-axis and the boundary line 88. The radiation detector 40 includes non-detecting regions 95, 96 in the projection plane 82, which do not belong to the detecting region 80, and which are created by the radiation source 20 projecting the respective expanded regions 90, 92 onto the projection plane 82 in respective virtual radiation fields VRF. In other words, the radiation detector 40 projects the region of interest 94 onto the projection plane 82, thereby creating a projection region 98 (see FIG. 5B), which is representative of the combination of the detecting region 80 and the non-detecting regions 95, 96.

Since the region of interest 94 including the designated region 33 lies parallel to the projection plane 82, the projection region 98 is similar in shape to the region of interest 94. In the illustrated embodiment, the region of interest 94, as well as the projection region 98, are of a rectangular shape.

Figure 6:
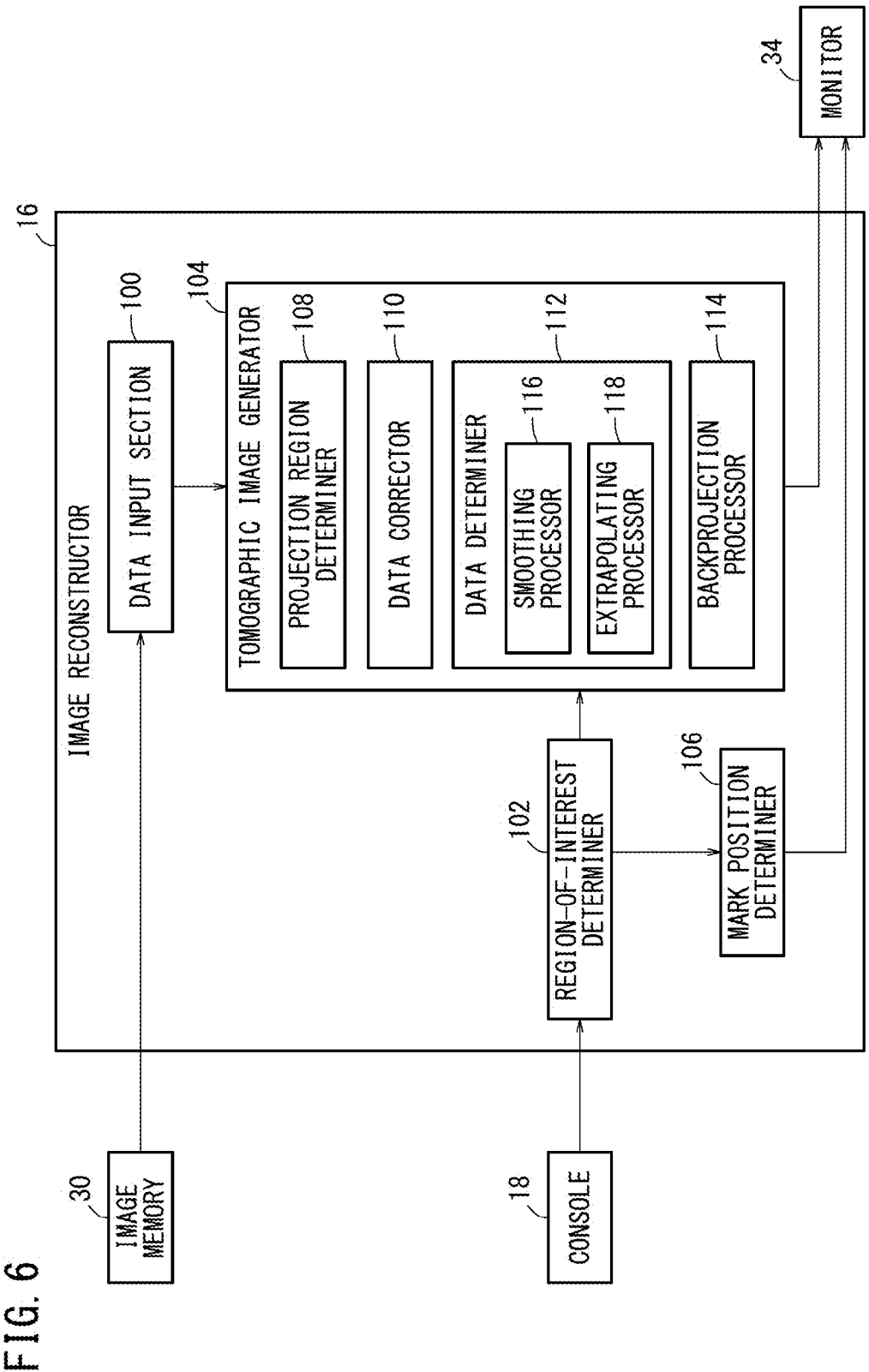
FIG. 6 is a detailed functional block diagram of an image reconstructor shown in FIG. 1.

FIG. 6 is a detailed functional block diagram of the image reconstructor 16 shown in FIG. 1.

As shown in FIG. 6, the image reconstructor 16 includes a data input section 100 for entering projection image data, etc., from the image memory 30, a region-of-interest determiner 102 for determining a region of interest 94 based on image capturing conditions (e.g., positional information of the designated region 33, the radiation source 20, etc.) supplied from the console 18, a tomographic image generator 104 (tomographic image generating unit) for generating a tomographic image within the region of interest 94 based on projection image data entered from the data input section 100 and the position of the region of interest 94, which is determined by the region-of-interest determiner 102, and a mark position determiner 106 for determining positions of marks that are representative of the position of the designated region 33, for example.

The tomographic image generator 104 includes a projection region determiner 108 for determining a respective projection region 98 for each radiographic image capturing process (or tomosynthetic image capturing process), a data corrector 110 for correcting the spectral intensity at each spatial frequency of the projection image data (image data) that exhibits geometric unsharpness due to the image capturing processes, a data determiner 112 for determining values of a plurality of pixels in the non-detecting regions 95, 96 by performing an extrapolating process and a smoothing process on the projection image data, and a backprojection processor 114 for performing a backprojection process on the projection image data (hereinafter also referred to as "expanded projection image data") on which the extrapolating process and smoothing process have been performed by the data determiner 112.

The data determiner 112 includes a smoothing processor 116 for performing a smoothing process on the projection image data along a direction, e.g., a direction that extends along the X-axis, perpendicular to a prescribed direction, e.g., a direction along the Y-axis, and an extrapolating processor 118 for performing an extrapolation process on the projection image data along the certain direction.

The tomographic image generating apparatus 10 according to the present embodiment is basically constructed as described above. An operation sequence of the tomographic image generating apparatus 10 will be described in detail below with reference to FIGS. 1 through 6 and the flowchart shown in FIG. 7.

Figure 7:
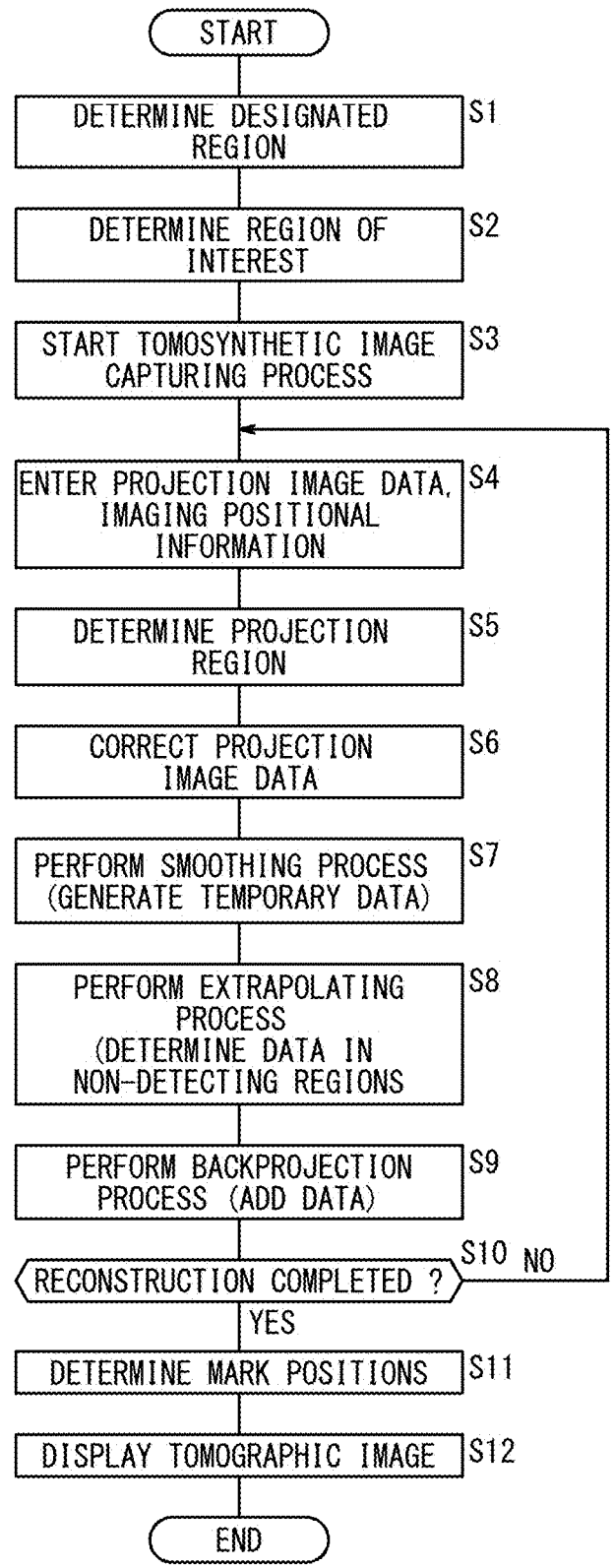
FIG. 7 is a flowchart of an operation sequence of the tomographic image generating apparatus shown in FIG. 1.

In step S1 shown in FIG. 7, the console 18 determines a designated region 33 in a tomosynthetic image capturing process according to an instruction from the user (a doctor or radiological technician). For example, the user determines the range of the designated region 33 (positions along the X-axis and the Y-axis) and/or the height of the designated region 33 (a position along the Z-axis) based on an interpretation of a radiographic image produced in a radiographic image capturing process, e.g., the scout radiographic image capturing process shown in FIG. 3A, which has already been carried out.

In step S2, the region-of-interest determiner 102 determines a region of interest 94 as a target region for which a tomographic image is to be generated. More specifically, the region-of-interest determiner 102 first acquires positional information from the console 18 concerning the designated region 33, the radiation source 20, the radiation detector 40, etc. Then, the region-of-interest determiner 102 determines expanded regions 90, 92 based on image capturing conditions shown in FIG. 4A (maximum Y-axis positions) and FIG. 4B (minimum Y-axis positions). The image capturing conditions include, for example, the distance between the radiation source 20 and the subject 24, the distance between the radiation source 20 and the casing 36 (radiation detector 40), the size of the radiation detector 40, etc. In FIG. 5A, the expanded regions 90, 92 are determined in order to maximize the size of the region of interest 94. However, the expanded regions 90, 92 may be determined in order to make the size of the region of interest 94 smaller than as illustrated.

Thereafter, the region-of-interest determiner 102 supplies positional information concerning the determined region of interest 94 to the tomographic image generator 104.

In step S3, the tomographic image generating apparatus 10 initiates a tomosynthetic image capturing process. The projection image data acquiring assembly 14 moves the radiation source 20 disposed in facing relation to the radiation detecting device 12 successively to the preset positions, and controls the radiation source 20 at the preset positions in order to apply radiation 26 to the subject 24 from respective different directions over the radiation detecting device 12, so as to produce a plurality of projection image data. Then, the projection image data acquiring assembly 14 outputs the projection image data, which are temporarily stored in the image memory 30. The projection image data acquiring assembly 14 may acquire projection image data in synchronism with, or independently and out of synchronism with, the execution of a backprojection process (step S9), to be described later. If such processes are carried out in synchronism with each other, then the storage capacity of the image memory 30, which serves as a buffer memory, can be reduced.

In step S4, the data input section 100 enters projection image data 120 (see FIG. 8A, for example) acquired in the tomosynthetic image capturing process. The data input section 100 may enter projection image data 120 according to the order in which the data are acquired or captured. If the data input section 100 enters projection image data 120 at the same time, the data input section 100 may also enter identification information thereof, which is associated with the order in which the projection image data 120 are captured. The data input section 100 also enters information (hereinafter referred to as "imaging position information") concerning the relative positional relationship between the radiation source 20 and the radiation detector 40 at the time that the projection image data 120 are acquired.

In step S5, the projection region determiner 108 determines a projection region 98 for a present image capturing process, based on the positional information of the region of interest 94 determined in step S2, and the imaging position information entered in step S5. In the present embodiment, the projection region determiner 108 determines a projection region 98 of only one size, irrespective of the positions of the radiation source 20 and the radiation detector 40. In order to reduce the storage capacity required to store the projection image data 120, the projection region determiner 108 may determine a projection region of minimum size, which will be used in the backprojection process (step S9), to be described later.

In step S6, the data corrector 110 corrects the projection image data 120 that was entered in step S4. The projection image data 120, which are produced from radiation 26 emitted from the radiation source 20, exhibit geometric unsharpness, i.e., image blurring, due to the image capturing processes. If the backprojection process is carried out directly on the projection image data 120 exhibiting such geometric unsharpness, then a tomographic image generated from the backprojection process tends to be significantly reduced in spectral intensity within a high spatial frequency band. Accordingly, the data corrector 110 corrects the projection image data 120 for the spectral intensity in the high spatial frequency band. Although the degree of correction varies depending on how the image capturing process was carried out, the data corrector 110 generally corrects the projection image data 120 in a manner that reduces spectral intensity in a low spatial frequency band, while enhancing spectral intensity in a high spatial frequency band. The spectral intensity may be corrected according to a convolution process in real space with length used as a unit (masking process), or a multiplexing process in a Fourier space with a reciprocal of the length used as a unit (filtering process).

A backprojection process, which is carried out after step S6, is referred to as a filter backprojection process. If a simple backprojection process including a shift-and-add process is employed, then the process of step S6 is not required.

As shown in FIG. 5B, the unsharpness referred to above occurs along the direction in which a projected image 99, which is projected on the projection plane 82 including the detection region 80, of the radiation source 20 moves relatively, the direction corresponding to a prescribed direction along which an extrapolating process, to be described later, is carried out. In the illustrated embodiment, the data corrector 110 corrects the projection image data 120 for each image row (linearly) along the Y-axis. As a result, it should be noted that differences between adjacent pixels along the X-axis are relatively increased, which tends to impair the smoothness of a gradation image along the X-axis.

In step S7, the smoothing processor 116 performs a smoothing process on the projection image data 120, which was corrected in step S6, along a direction that extends along the X-axis, perpendicular to a prescribed direction, e.g., along the Y-axis. The smoothing process will be described in detail below with reference to FIGS. 8A and 8B.

Figure 8A:
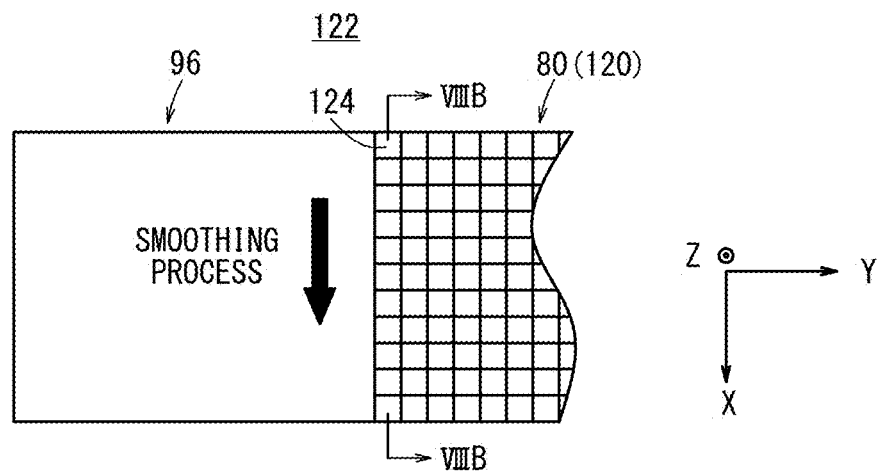
FIGS. 8A and 8B are diagrams showing a specific example of a smoothing process performed in step S7 shown in FIG. 7.

FIG. 8A schematically shows expanded projection image data 122 within the projection region 98 (see FIG. 5B). The projection image data 120, which form part of the expanded projection image data 122, are made up of a plurality of pixels 124. In other words, a two-dimensional matrix of pixels 124 is disposed within the detecting region 80. For illustrative purposes, a plurality of pixels, which are present in the non-detecting region 96, are omitted from illustration.

The smoothing processor 116 performs the smoothing process along the direction of the arrow (X-axis) on at least one image row within the detecting region 80 that lies adjacent to the non-detecting region 96. The smoothing process may be any of various known processes, e.g., a moving average process, a convolution process including a Gaussian filter, a statistical process including a median filter or a maximum value/minimum value filter, a morphological process, and an edge-preserving smoothing process. The smoothing processor 116 may perform the smoothing process on each image row, or on a plurality of image rows at a time.

Figure 8B:
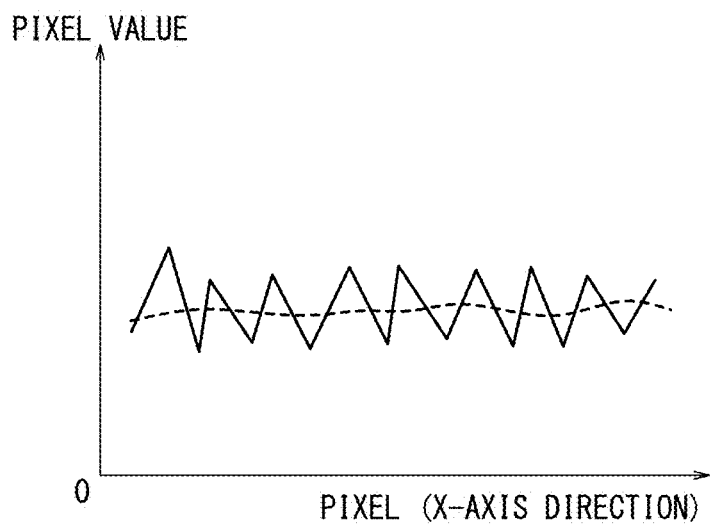

FIG. 8B shows pixel value profiles taken along line VIIIB-VIIIB of FIG. 8A. More specifically, the solid-line curve represents a pixel value profile produced before the smoothing process is carried out, and the broken-line curve represents a pixel value profile produced after the smoothing process is carried out. As can be seen from FIG. 8B, variations in the pixel values along the X-axis are reduced after the smoothing process is carried out.

The values of the pixels 124, which are calculated by the smoothing process in step S7, are stored as temporary data, rather than being applied to update and overwrite the present projection image data. This is because the actual detected values of the pixels 124, which belong to the detecting region 80, should preferably be used for generating a tomographic image.

In step S8, the extrapolating processor 118 performs an extrapolating process on the temporary data, which was smoothed in step S7, along the prescribed direction (Y-axis). The extrapolating process will be described in detail below with reference to FIGS. 9A and 9B.

Figure 9A:
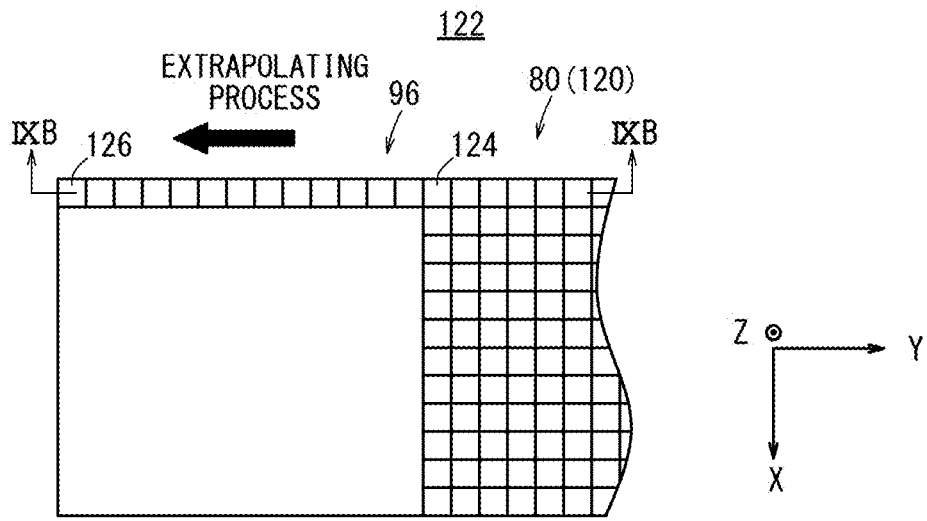
FIGS. 9A and 9B are diagrams showing a specific example of an extrapolating process performed in step S8 shown in FIG. 7.

FIG. 9A schematically shows expanded projection image data 122 within the projection region 98 (see FIG. 5B). The expanded projection image data 122, the projection image data 120, and the detecting region 80 shown in FIG. 9A are identical to those shown in FIG. 8A and will not be described in detail below. A two-dimensional matrix of pixels 126 are disposed in the non-detecting region 96. For illustrative purposes, only one line of pixels 126 along the Y-axis is illustrated, whereas other pixels in the non-detecting region 96 are omitted from illustration.

The extrapolating processor 118 performs an extrapolating process along the direction indicated by the arrow (Y-axis) on all of the pixels 126 belonging to the non-detecting region 96, thereby determining the values of the pixels 126. The extrapolating process may be any of various known extrapolating processes, e.g., a function approximating process such as a polygonal process or a nonlinear function process, a zeroth-order (replacement) extrapolating process, a first-order (linear) extrapolating process, and a third-order (cubic) extrapolating process. The range of pixels 124 used for the extrapolating process may be changed depending on the extrapolating process used. For example, one pixel is processed if the zeroth-order extrapolating process is employed, and two pixels are processed if the first-order extrapolating process is employed.

Figure 9B:
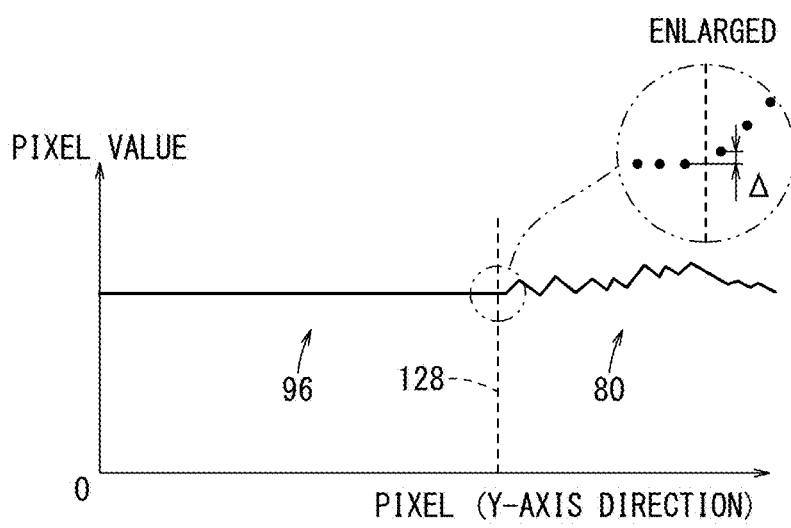

FIG. 9B shows a pixel value profile taken along line IXB-IXB of FIG. 9A. A boundary line (boundary) 128 between the detecting region 80 (right-hand region) and the non-detecting region 96 (left-hand region) is represented by the broken line. The solid-line curve represents a pixel value profile produced in a case where values of the pixels 126 in the non-detecting region 96 are determined according to the zeroth-order extrapolating process. As can be understood from FIG. 9B, values of the pixels 126 belonging to image rows in the non-detecting region 96 (i.e., values of the temporary data calculated in step S7) are identical.

For preventing artifacts from occurring, the extrapolating processor 118 preferably determines the values of the pixels 126 that are present within the non-detecting region 96 (and also within the same image rows) so as to be as uniform as possible. To meet such a demand, the extrapolating processor 118 preferably employs a low-order extrapolating process, such as the zeroth-order extrapolating process or the first-order extrapolating process. For the same reason, the differences Δ between values of the pixels 124 adjacent to the boundary line 128 and values of the pixels 126 adjacent to the boundary line 128 may be set so as to fall within a prescribed range. It has been confirmed that, with the values of the pixels 124, 126 being established in this manner, it is possible to generate an appropriate tomographic image independently of various combinations of body types of subjects 24, locations of regions of interests 94, and image capturing conditions.

In step S9, the backprojection processor 114 generates backprojection data for each image capturing process from the expanded projection image data 122 acquired in step S8. A process of determining the value of a pixel 130 (see FIG. 10), which is present within the region of interest 94, will be described below with reference to FIG. 10.

Figure 10:
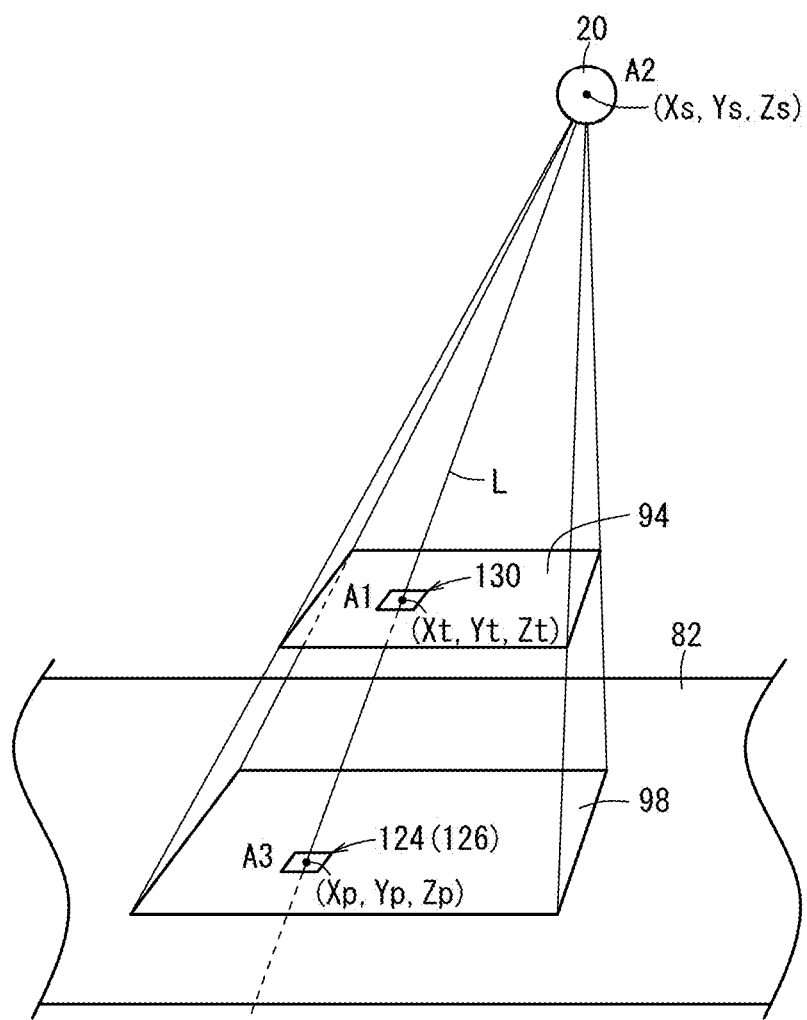
FIG. 10 is a diagram showing a specific example of a backprojection process performed in step S9 shown in FIG. 7.

As shown in FIG. 10, it is assumed that the coordinates corresponding to the position of the pixel 130 are indicated by A1 (Xt, Yt, Zt), and the coordinates corresponding to the position of the radiation source 20 are indicated by A2 (Xs, Ys, Zs). It is also assumed that the projection plane 82 is set to Z=Zp (known value) parallel to the X-Y plane.

Among the positions, i.e., the coordinates A3 (Xp, Yp, Zp) on the projection region 98 onto which the radiation source 20 projects the pixel 130, the values Xp, Yp thereof, which are not already known, are calculated according to simple geometric observations by the following equations:

$$Xp = Xt + (Xs - Xt) \cdot (Zp - Zt)/(Zs - Zt) \quad (1)$$

$$Yp = Yt + (Ys - Yt) \cdot (Zp - Zt)/(Zs - Zt) \quad (2)$$

The position at the coordinates A3 represents a point of intersection between the projection plane 82 and a straight line N interconnecting the pixel 130 and the position of the radiation source 20. The backprojection processor 114 adds the values of pixels 124, 126 (the values of backprojection data) corresponding to the coordinates A3 to the value of the pixel 130. If the coordinates A3 are present between the positions of the pixels 124 and 126, then the backprojection processor 114 may calculate the values of backprojection data according to a known interpolation process. In this manner, the same calculating process (backprojection process) is carried out on all of the pixels 130 that are present within the region of interest 94. Since the values of the pixels 126 in the non-detecting regions 95, 96 have been determined in advance, different calculations apart from the backprojection process, e.g., product-sum calculations for each pixel 126, are not necessary.

In step S10, the image reconstructor 16 judges whether or not the reconstruction of an image based on all the expanded projection image data 122 is completed. If the image reconstructor 16 determines that the reconstruction is not completed (S10: NO), then control returns to step S4 and steps S4 through S9 are repeated. In other words, the backprojection data generated from radiation 26 emitted from the radiation source 20 at different preset positions (angles) are successively added to gradually generate a tomographic image 142 (see FIGS. 11B through 12B) as a complete image. If the image reconstructor 16 determines that the reconstruction is completed (S10: YES), then control proceeds to step S11.

Advantages of the smoothing process (step S7) will be described below with reference to FIGS. 11A and 11B. FIG. 11A shows a visualized tomographic image 136 obtained for a case in which the smoothing process is not performed. FIG. 11B shows a visualized tomographic image 142 obtained for a case in which the smoothing process is performed. During generation of the visualized tomographic image 142, steps S7 and S8 also are carried out on the non-detecting region 95 (see FIG. 5B), which is not shown in FIGS. 8A and 9A, as well as the non-detecting region 96.

As shown in FIG. 11A, the visualized tomographic image 136, which is obtained without the smoothing process being performed, includes image regions 138, 140, which correspond respectively to the non-detecting regions 95, 96, having striped density irregularities, i.e., so-called artifacts, therein that extend along the Y-axis. As shown in FIG. 11B, the visualized tomographic image 142, which is obtained with the smoothing process being performed, does not contain artifacts in any image regions thereof. Therefore, if the smoothing process is performed on the pixels 126 in the non-detecting regions 95, 96 along a direction, e.g., a direction that extends along the X-axis, perpendicular to a prescribed direction, e.g., a direction along the Y-axis, the expanded projection image data 122, as well as the tomographic image 142 generated with the expanded projection image data 122 added thereto, are prevented from suffering from artifacts. The smoothing process is particularly effective in the case that a tomographic image is generated according to a filter backprojection process.

The extrapolating process according to the present invention determines values of the pixels 126 in the non-detecting regions 95, 96, regardless of whether or not any regions of the subject 24 actually are present in the expanded regions 90, 92. More specifically, if a region of the subject 24 is present within the designated region 33, and a region of the subject 24 is not present within the expanded regions 90, 92, then the energy of the image, i.e., the attenuation rate of radiation 26, may not be constant. If the energy of the image is not kept constant, then in the case that the tomographic image 142 is output as a negative image, the density corresponding to blank regions within the expanded regions 90, 92 may be reduced relatively to other regions thereof. In other words, the edge contrast of the density near the edge (contour line) of the subject 24 tends to be lowered. The term "blank regions" refers to image regions where radiation 26 is detected or can be detected without actually having passed through the subject 24.

The tomographic image generator 104, e.g., the data corrector 110, may carry out a blackening process for bringing, to a prescribed constant value, values of plural pixels 130 that belong to a prescribed region existing within the region of interest 94, or more specifically, a prescribed region existing within the expanded regions 90, 92, which are external regions (blank regions) of the subject 24. For example, image regions belonging to the blank regions can be identified using a known algorithm, such as a segmentation process or the like.

The blackening process may be carried out on the generated tomographic image 142, or on each of the expanded projection image data 122. In this case, the tomographic image generator 104 performs a blackening process for bringing, to a prescribed constant value, values of plural pixels 126 that belong to a prescribed region existing within the projection region 98, or more specifically, a prescribed region existing within the non-detecting regions 95, 96, which are external regions (blank regions) of the subject 24. For the purpose of reducing the amount of processed data, it is preferable to perform a blackening process on as few images as possible, i.e., a completed single tomographic image 142.

In step S7 (smoothing process), an edge-preserving smoothing process may be performed on the projection image data 120. According to the edge-preserving smoothing process, since the edge contrast of the density near the edge (contour line) of the subject 24 is lowered, reductions in image density within blank regions are minimized.

The blackening process performed in this manner serves to increase the dazzle resistance at the time that the user sees the tomographic image 142, and hence increases the diagnostic capability of the image. The blackening process is particularly effective for cases in which mammographic images are output having a wide dynamic range of luminance.

In step S11, the mark position determiner 106 determines the positions of marks 144R, 144L (see FIG. 12A) to be displayed together with the tomographic image 142 generated in steps S4 through S9. For example, the mark position determiner 106 calculates and determines the positions of boundary lines between the designated region 33 and the expanded regions 90, 92, based on positional information concerning the region of interest 94, which is supplied from the region-of-interest determiner 102.

In step S12, the tomographic image generating apparatus 10 displays the tomographic image 142 as a diagnostic image on the monitor 34.

Figure 12A:
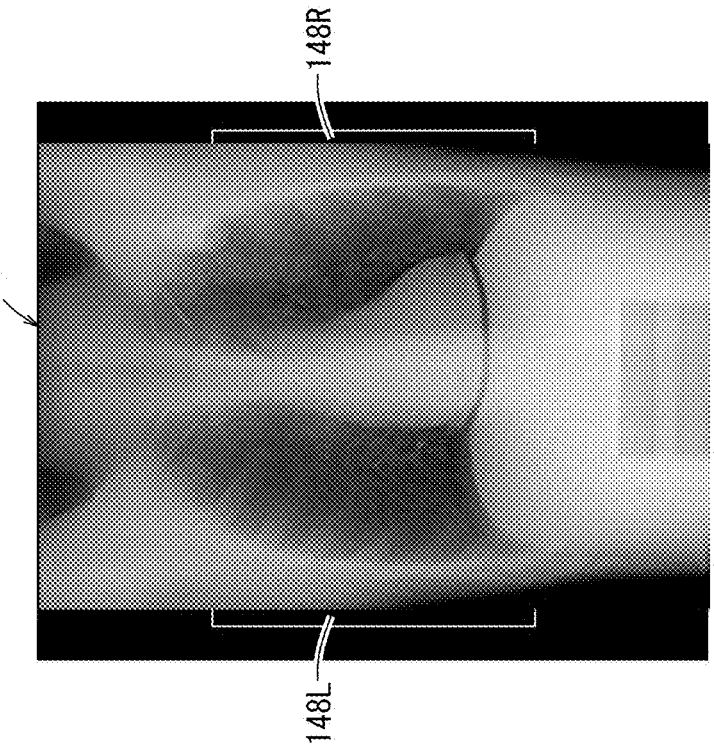
FIGS. 12A and 12B are views of specific examples of tomographic images displayed in step S12 shown in FIG. 7.

As shown in FIG. 12A, the monitor 34 displays a tomographic image 142 representing a chest section of the subject 24. The tomographic image 142, which does not contain artifacts therein as shown in FIG. 11B, is obtained by using the expanded projection image data 122, which are free of striped irregularities that extend along the Y-axis.

As shown in FIG. 12A, the displayed tomographic image 142 includes a mark 144L on a left hand side thereof, which represents an open square bracket, and a mark 144R on a right hand side thereof, which represents a closed square bracket. The marks 144L, 144R, when seen in combination, define a vertical range, which serves to notify the user of the location of the designated region 33 within the tomographic image 142.

Figure 12B:
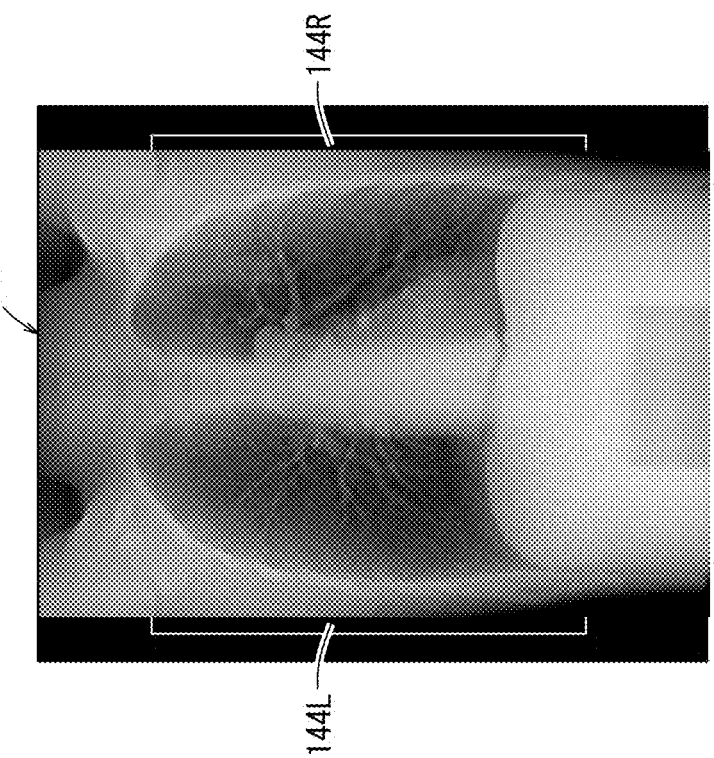

FIG. 12B shows a displayed tomographic image 146 of the region of interest 94 along a sectional plane 84 (see FIG. 4A) at a different height. The displayed tomographic image 142 includes respective marks 148L, 148R on left and right hand sides thereof. The marks 148L, 148R jointly define a vertical range, which is smaller than the vertical range defined by the marks 144L, 144R shown in FIG. 12A. In other words, the designated region 33 displayed in the tomographic image 146 is smaller than the designated region 33 displayed in the tomographic image 142. Thus, the user is able to recognize that the sectional plane 84 (see FIG. 4A) of the tomographic image 146 is positioned more in a positive direction along the Z-axis than the sectional plane 84 of the tomographic image 142.

Alternatively, the marks 144L, 144R may be marks representative of a distribution of added numbers of pixels 124 that belong to the detecting region 80, from among the expanded projection image data 122 used to generate the tomographic image 142.

For example, the marks 144L, 144R, which are displayed together with the tomographic image 142 shown in FIG. 12A, enable identification of the image region, which has used the values of the pixels 124 belonging to the detecting region 80, i.e., the values of the projection image data 120, in all the expanded projection image data 122 (at a proportion of 100%). The distribution of added numbers may be not only in two levels (100% or otherwise), but also in three or more levels (e.g., less than 50%, 50 through 75%, and 75% or more). The marks may be represented in any combination of characters, figures, patterns, hues, etc.

As described above, the extrapolating process is performed on the acquired projection image data 120 along a prescribed direction (Y-axis) in order to generate a tomographic image 142 without the need for any special processing sequences. Since the smoothing process along a prescribed vertical direction (X-axis) also is performed in order to determine the values of the pixels 126 in the non-detecting regions 95, 96, it is possible to reduce striped density irregularities that extend along the Y-axis, which might otherwise be caused by the extrapolating process. Consequently, in a case where a tomographic image 142 including expanded regions is generated, the amount of processed data required to generate the tomographic image 142 is reduced, and artifacts are prevented from occurring in the tomographic image 142.

The present invention is not limited to the above embodiment, but various changes and modifications may be made without departing from the scope of the invention.

For example, in the above embodiment, the backprojection processor 114 digitally adds backprojection data from respective image capturing processes. However, electric charges may be successively accumulated (added in an analog fashion) in the storage capacitors 53 in the radiation detector 40 according to a plurality of successive image capturing processes.

Various processing sequences of the image reconstructor 16 may be changed in relation to the order thereof or the processes performed thereby, insofar as the advantages of the present invention can be attained. Specific examples of such changes will be described below.

[1] The data determiner 112 may reverse the order of steps S7 and S8 (see FIG. 7). More specifically, the data determiner 112 may perform the extrapolating process (step S8) and then perform the smoothing process (step S7) along the vertical direction (X-axis) on the pixels 126 in the non-detecting regions 95, 96, the values of which have temporarily been determined by the extrapolating process.

[2] The backprojection processor 114 may include the functions of the data determiner 112. The backprojection processor 114, which has the functions of the data determiner 112, successively calculates backprojection data using the projection image data 120, rather than the expanded projection image data 122. More specifically, in case the coordinates A3 are not present in the detecting region 80 shown in FIG. 10, the backprojection processor 114 carries out a processing sequence, which is equivalent to the processing sequence of the data determiner 112, in order to determine the values of pixels 126 corresponding to the coordinates A3. In this manner, the storage capacity corresponding to the non-detecting regions 95, 96 can be reduced.

[3] The tomographic image generator 104 may reverse the order of steps S6 and S7 (see FIG. 7). More specifically, the data corrector 110 may correct the projection image data 120 (step S6) after the smoothing process (step S7) has been carried out. In this manner, temporary data can be generated before the spectral intensity in the high spatial frequency band increases in the detecting region 80.

Although certain preferred embodiments of the present invention have been shown and described in detail, it should be understood that various changes and modifications may be made to the embodiments without departing from the scope of the invention as set forth in the appended claims.

What is claimed is:

1. A tomographic image generating apparatus comprising:
a radiation source for applying radiation to a subject;
a radiation detector for detecting radiation that has passed through the subject and acquiring projection image data from the detected radiation; and
a tomographic image generating unit for generating a tomographic image in a region of interest disposed in the subject and interposed between the radiation source and the radiation detector, using a plurality of projection image data acquired by the radiation detector in image capturing processes, which are carried out while a relative positional relationship between the radiation source and the radiation detector successively changes,
wherein the tomographic image generating unit includes a data determiner for performing an extrapolating process on each of the acquired projection image data along a prescribed direction, and for performing a smoothing process on each of the acquired projection image data along a direction perpendicular to the prescribed direction, thereby determining values of a plurality of pixels in non-detecting regions, which do not belong to a detecting region of the radiation detector, the determined values of the pixels also being used to generate the tomographic image.

2. The tomographic image generating apparatus according to claim 1, wherein the prescribed direction comprises a direction projected onto a projection plane including the detecting region, and extending parallel to a direction of relative motion of the radiation source.

3. The tomographic image generating apparatus according to claim 2, wherein the tomographic image generating unit further includes a projection region determiner for determining a projection region on the projection plane, onto which the radiation source projects the region of interest, based on information concerning the position of the region of interest and the relative positional relationship; and
the data determiner determines values of a plurality of pixels in non-detecting regions, which belong to the projection region determined by the projection region determiner, and which do not belong to the detecting region.

4. The tomographic image generating apparatus according to claim 3, wherein the projection region determiner determines a projection region of one size irrespective of the relative positional relationship.

5. The tomographic image generating apparatus according to claim 1, wherein the tomographic image generating unit further includes a data corrector for correcting a spectral intensity at each spatial frequency of the projection image data that exhibits geometric unsharpness due to the image capturing processes.

6. The tomographic image generating apparatus according to claim 5, wherein the data corrector corrects the projection image data before the data determiner determines the values of the pixels in the non-detecting regions.

7. The tomographic image generating apparatus according to claim 1, wherein the data determiner determines the values of the pixels in the non-detecting regions such that differences between the values of pixels adjacent to boundaries between the detecting region and the non-detecting regions fall within a prescribed range.

8. The tomographic image generating apparatus according to claim 1, wherein the data determiner performs a zeroth-order extrapolating process or a first-order extrapolating process to thereby determine the values of the pixels in the non-detecting regions.

9. The tomographic image generating apparatus according to claim 1, wherein the tomographic image generating unit performs a blackening process on the tomographic image for bringing to a prescribed constant value the values of plural pixels that belong to a prescribed region existing within the region of interest.

10. The tomographic image generating apparatus according to claim 1, wherein the data determiner determines the values of the pixels in the non-detecting regions by performing the extrapolating process on a plurality of pixels in the detecting region, based on values produced by the smoothing process performed along the direction perpendicular to the prescribed direction.

11. The tomographic image generating apparatus according to claim 1, wherein the data determiner determines the values of the pixels in the non-detecting regions by performing the smoothing process along the direction perpendicular to the prescribed direction on a plurality of pixels in the non-detecting regions, the values of which are temporarily determined by the extrapolating process, after the extrapolating process has been performed.

12. The tomographic image generating apparatus according to claim 1, further comprising a display unit for displaying marks indicative of a distribution of added numbers of pixels belonging to the detecting region and which are used to generate the tomographic image, the marks being displayed in overlapping relation to the tomographic image generated by the tomographic image generating unit.

13. A method of generating a tomographic image of a subject using a radiation source for applying radiation to the subject, and a radiation detector for detecting radiation that has passed through the subject and acquiring projection image data from the detected radiation, and by carrying out image capturing processes while a relative positional relationship between the radiation source and the radiation detector successively changes, comprising the steps of:

acquiring a plurality of projection image data through the radiation detector; and performing an extrapolating process on each of the acquired projection image data along a prescribed direction, and performing a smoothing process on each of the acquired projection image data along a direction perpendicular to the prescribed direction, thereby determining values of a plurality of pixels in non-detecting regions, which do not belong to a detecting region of the radiation detector, the determined values of the pixels also being used to generate the tomographic image.

* * * * *